(12) United States Patent
Lee et al.

(10) Patent No.: US 7,450,581 B2
(45) Date of Patent: Nov. 11, 2008

(54) ETHERNET PASSIVE OPTICAL NETWORK FOR CONVERGENCE OF BROADCASTING AND COMMUNICATION

(75) Inventors: Ki-Cheol Lee, Suwon-si (KR); Yun-Je Oh, Yongin-si (KR); Tae-Sung Park, Yongin-si (KR); Jun-Ho Koh, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 1064 days.

(21) Appl. No.: 10/771,943

(22) Filed: Feb. 4, 2004

(65) Prior Publication Data

US 2004/0264400 A1    Dec. 30, 2004

(30) Foreign Application Priority Data

Jun. 30, 2003    (KR) .............. 10-2003-0043846

(51) Int. Cl.
*H04L 12/56* (2006.01)
(52) U.S. Cl. .................... 370/392; 370/471
(58) Field of Classification Search ........... 370/392, 370/471
See application file for complete search history.

(56) References Cited

U.S. PATENT DOCUMENTS

| | | | | |
|---|---|---|---|---|
| 6,058,227 A * | 5/2000 | Wong | ............... | 385/16 |
| 6,775,483 B1 * | 8/2004 | Ikushima et al. | ............... | 398/186 |
| 7,099,578 B1 * | 8/2006 | Gerstel | ............... | 398/5 |
| 7,154,879 B1 * | 12/2006 | Pfeffer et al. | ............... | 370/352 |
| 7,245,621 B2 * | 7/2007 | Sala et al. | ............... | 370/392 |
| 7,245,628 B2 * | 7/2007 | Shi et al. | ............... | 370/437 |
| 7,260,119 B2 * | 8/2007 | Sala et al. | ............... | 370/510 |
| 7,272,321 B1 * | 9/2007 | Kuo et al. | ............... | 398/99 |
| 2003/0177215 A1 * | 9/2003 | Sutherland et al. | ............... | 709/223 |

FOREIGN PATENT DOCUMENTS

| | | |
|---|---|---|
| JP | 2003-092583 | 3/2003 |
| JP | 2003-101560 | 4/2003 |

* cited by examiner

*Primary Examiner*—Edan Orgad
*Assistant Examiner*—Jay P Patel
(74) *Attorney, Agent, or Firm*—Cha & Reiter, LLC

(57) ABSTRACT

An EPON for providing a subscriber with a high speed/high capacity data service and a real time digital broadcasting/image service includes an OLT for switching digital broadcasting/image data according to broadcasting/image selection information from each ONT, modulating the switched data into frequencies assigned to each ONT, coupling a broadcasting/image signal with a communication signal, and transmitting the coupled signal. The digital broadcasting/image data is transmitted from an outside broadcaster, the broadcasting/image signal is a combination of the modulated signals, and the communication signal is obtained by optically modulating communication data from an IP network. Further included in the EPON are multiple ONTs, and a divider for dividing the signal from the OLT for routing to each of the multiple ONTs, combining signals from the multiple ONTs, and transmitting the combined signal to the OLT.

16 Claims, 4 Drawing Sheets

ETHERNET PASSIVE OPTICAL NETWORK FOR CONVERGENCE OF BROADCASTING AND COMMUNICATION

CLAIM OF PRIORITY

This application claims priority to an application entitled "Ethernet passive optical network for convergence of broadcasting and communication," filed in the Korean Intellectual Property Office on Jun. 30, 2003 and assigned Serial No. 2003-43846, the contents of which are hereby incorporated by reference.

BACKGROUND OF THE INVENTION

1. Field of the Invention

The present invention relates to an apparatus for serving a CAS broadcasting encrypted in various ways in a convergence system of broadcasting and communication.

2. Description of the Related Art

In order to effectively provide subscribers with a high speed/high capacity data service and a real time digital broadcasting/image service, data must be transmitted at a speed of more than 100 Mbps. However, such a high speed/high capacity data service and a real time digital broadcasting/image service cannot be provided by means of digital subscriber line (DSL) or a cable modem, which have attain at maximum a data transmission rate of merely 50 Mbps. In the spotlight at present, and as an outgrowth of research into types of high speed/high capacity data service, a passive optical network (hereinafter, referred to as PON) has been proposed as an economical solution.

PONs come in a number of varieties. There are, for example, ATM-PONs (Asynchronous Transfer Mode PONS), WDM-PONs (wavelength division multiplexing PONs) and Ethernet-PONs (hereinafter, referred to as EPON) which are based ATM-, WDM- and Ethernet-based, respectively. Moreover, for a high speed optical transmission to an ordinary home, a fiber to the home (FTTH) structure in the EPON has been proposed and is now being developed.

In general, the EPON has been basically developed to include communication data. In the EPON, for data transmission, an optical line terminal (hereinafter, referred to as OLT) transmits gigabit Ethernet signals at a speed of 1.25 Gbps to optical network terminals (hereinafter, referred to as ONTs) by means of a wavelength of 1550 nm. The ONTs likewise transmit gigabit Ethernet signals at a speed of 1.25 Gbps to the OLT, but by means of a wavelength of 1310 nm.

A growing need for broadcasting has required that the EPON employ broadcasting signals, and, for this, in an overlay broadcasting including method shown in FIG. 1, broadcasting signals are transmitted to the ONTs by means of wavelengths for broadcasting signals. These wavelengths differ from those utilized as communication data wavelengths.

FIG. 1 is a block diagram of a conventional EPON for convergence of broadcasting and communication.

As shown in FIG. 1, the conventional EPON for convergence of broadcasting and communication includes an OLT 100, multiple ONTs 200-1 to 200-N, a passive optical splitter 118, and an optical cable. The OLT 100 is a sub-system located between a user and a service node, receives a broadcasting signal and a communication signal from a broadcaster and a communication service provider, converts the signals into an optical signal containing bundled components corresponding to the electrical signals, and then transmits one tied optical signal. The multiple ONTs 200-1 to 200-N are user-side apparatuses and send information transmitted from the OLT 100 to a user. The optical cable connects the OLT 100 to the multiple ONTs 200-1 to 200-N.

Specifically, the OLT 100 performs a light conversion for a broadcasting signal transmitted through a broadcasting network through elements 115, 116, performs an optical amplification through element 117 for the converted signal, and then transmits the amplified signal. Further, the OLT 100 receives communication data from an internet protocol (hereinafter, referred to as IP) network through an IP router 111, converts the communication data into an optical signal through element 112, and then transmits the optical signal through element 113. The OLT 100 receives data from the ONTs 200-1 to 200-N and transmits the data to the IP network through the IP router 111.

Each of the ONTs 200-1 to 200-N receives a broadcasting signal through respective broadcasting receivers 119-1 to 119-N, and transmits the broadcasting signal to a user through respective broadcasting set-top boxes (STBs) 122-1 to 122-N. The ONTs 200-1 to 200-N also receive communication data through receivers 120-1 to 120-N, and transmit the communication data to a user through EPON ONT function processing units 123-1 to 123-N. Furthermore, the ONTs 200-1 to 200-N receive communication data transmitted from a user through the EPON ONT function processing units 123-1 to 123-N, and transmit the communication data to the OLT 100 through burst mode transmitters 121-1 to 121-N.

The above-described EPON for conventional broadcasting requires an erbium doped fiber amplifier (EDFA) 117, which is an expensive optical amplifier for amplifying a broadcasting signal, in order to enable an OLT 100 to transmit an analog broadcasting signal to the ONTs 200-1 to 200-N. On the other hand, if digital rather than analog broadcasting is involved, the expensive EDFA 117 is needed when the number of digital broadcasting channels increases.

Since all broadcasting channels are respectively transmitted to the ONTs 200-1 to 200-N, the ONTs 200-1 to 200-N need expensive optical receivers having specifications of high quality, such as high reception sensitivity and superior noise characteristic, in order to receive the transmitted broadcasting signals.

It is expected, moreover, that users will require in the future, in addition to digital broadcasting, real time digital image service of high quality. Unfortunately, however, the conventional EPON cannot deliver a real time digital image of high quality.

Furthermore, since the conventional EPON has no scheme (strategy; means; device) by which to enable the ONTs 200-1 to 200-N to transmit information regarding broadcasting to the OLT 100, it cannot realize an interactive broadcasting function which will eventually be required.

SUMMARY OF THE INVENTION

The present invention has been made to solve the above-mentioned problems occurring in the prior art, and an object of the present invention is to provide an Ethernet passive optical network for convergence of broadcasting and communication, which can provide a user with high capacity and high speed communication data in addition to real time digital broadcasting/image signals of high quality.

It is another object of the present invention to provide an Ethernet passive optical network, in which an OLT selects broadcasting channels required by subscribers and transmits the selected channels to an ONT. Advantageously, the Ethernet passive optical network therefore need not employ an EDFA for multiple broadcastings or incur the concomitant expense. As a further consequence and benefit, the ONT can employ a low-price optical receiver meeting relatively low-quality specifications.

It is a further object of the present invention to provide an Ethernet passive optical network, in which a quality of service (QoS) can be secured in transmitting not only digital broadcasting but also a digital image of high quality which will be required by subscribers in the future.

It is still another object of the present invention to provide an Ethernet passive optical network, in which interactive broadcasting functions can be performed by transmitting broadcasting information through a communication data line in an EPON. In order to accomplish the aforementioned objects, according to an embodiment of the present, there is provided an EPON that includes an optical line terminal (OLT) for switching digital broadcasting and/or digital image data according to broadcasting and/or image selection information from each of multiple optical network terminals (ONTs). The OLT modulates the switched data into frequencies assigned to each ONT, couples with a communication signal a signal formed from combining the modulated data, and transmits the coupled signal. The digital broadcasting and/or digital image data is transmitted from an outside broadcaster. The communication signal is obtained by optically modulating communication data from an IP network. The EPON further includes the multiple ONTs, which are configured for receiving an optical signal from the OLT, dividing the optical signal into the combined signal and the communication signal, converting the divided signals into electrical signals, demodulating the converted combined signal into assigned frequencies, outputting the demodulated information and the converted communication signal to a user, receiving from the user communication data and the broadcasting and/or image selection information, and outputting the communication data and broadcasting and/or image selection information to the OLT. The EPON also has a divider for dividing the signal from the OLT among the multiple ONTs, joining signals from the multiple ONTs, and transmitting the joined signal to the OLT.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, details of known functions and configuration incorporated herein will be omitted for clarity of presentation.

Figure 1:
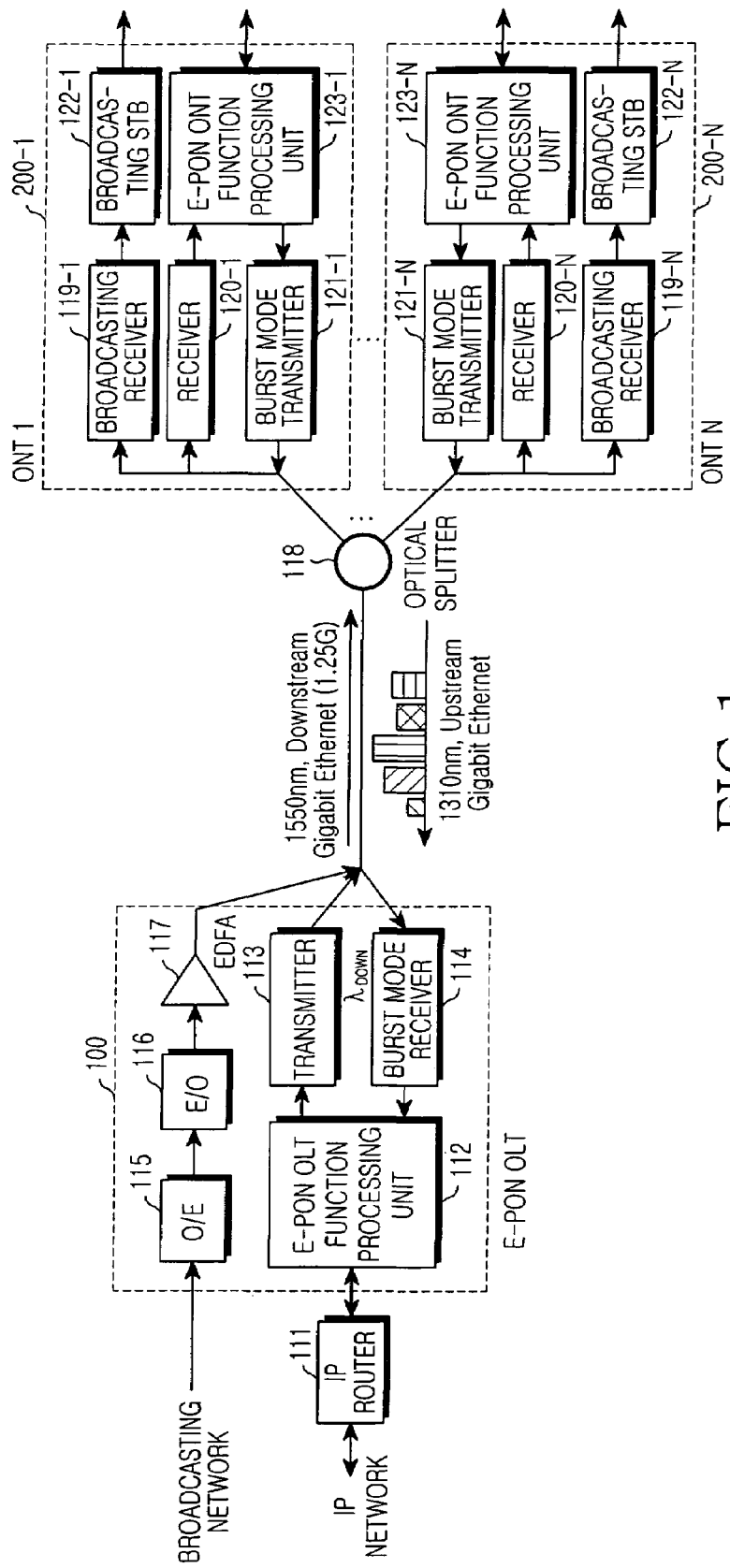
FIG. 1 is a block diagram of a conventional EPON for convergence of broadcasting and communication.
Figure 2:
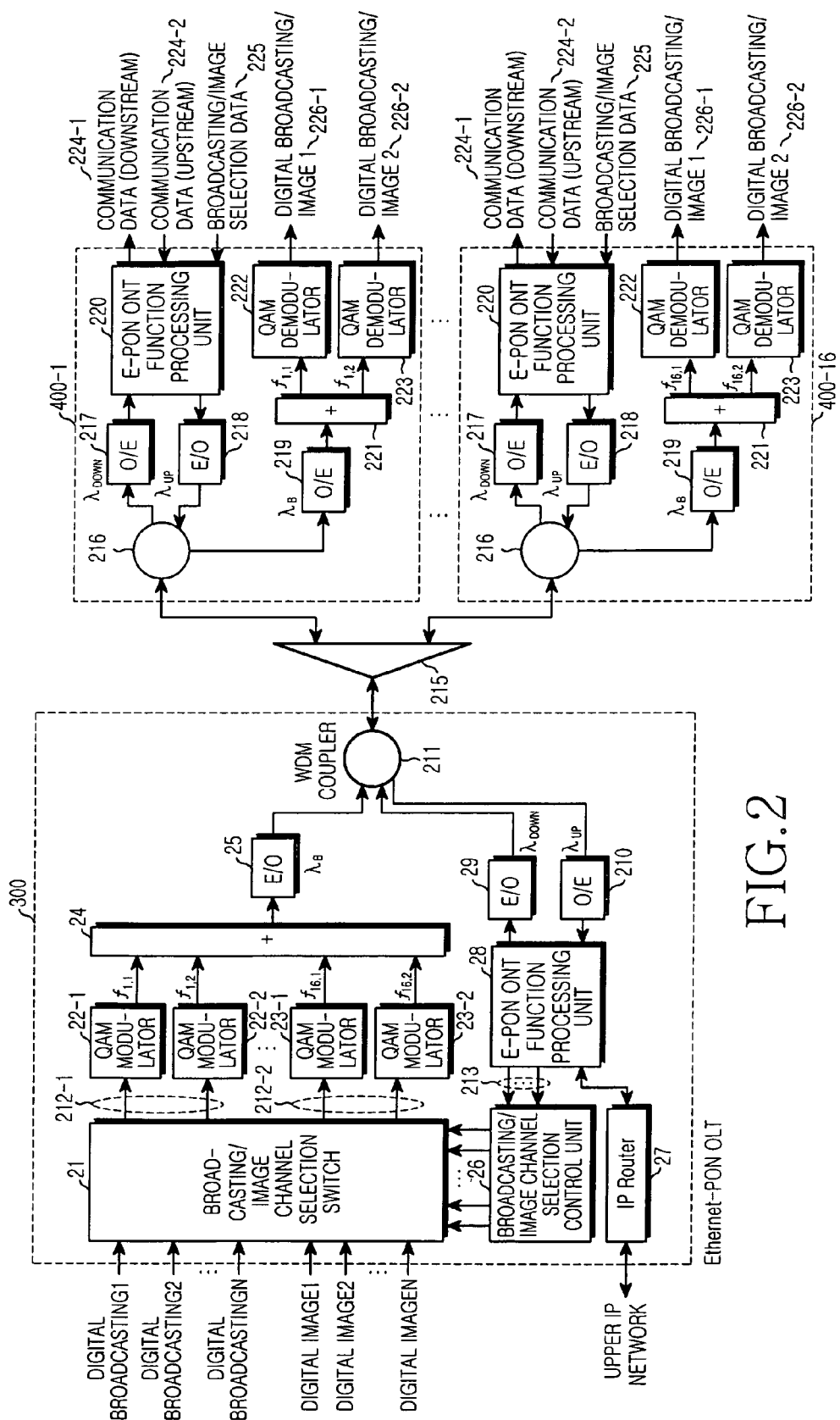
FIG. 2 is a block diagram of an EPON for convergence of broadcasting and communication according to an embodiment of the present invention.

FIG. 2 shows, by way of illustrative and non-limitative example, a block diagram of an Ethernet passive optical network (hereinafter, referred to as EPON) for convergence of broadcasting and communication according to an embodiment of the present invention.

The EPON according to the present invention includes one OLT 300, an optical divider 215 and 16 ONTs 400-1 to 400-16. Each of ONTs 400-1 to 400-16 is assigned to a respective user. The OLT 300 includes a broadcasting/image channel selecting switch 21, a broadcasting/image channel selection control unit 26, quadrature amplitude modulation (hereinafter, referred to as QAM) modulators 22-1 to 22-32, a combiner 24, an optical transmitter 25, an internet protocol (hereinafter, referred to as IP) router 27, an EPON OLT function processing unit 28, an optical transmitter 29, an optical receiver 210, and a wavelength division multiplexing (hereinafter, referred to as WDM) coupler 211.

The broadcasting/image channel selecting switch 21 switches motion picture experts group (MPEG) broadcasting and image data. The broadcasting/image channel selection control unit 26 receives selection channel information from the ONTs 400-1 to 400-16 and transmits a control signal for selecting each broadcasting/image channel to the broadcasting/image channel selecting switch 21. The QAM modulators 22-1 to 22-32 are connected to the broadcasting/image channel selecting switch 21 and digitally modulate the selected broadcasting/image channel. The combiner 24 is connected to the QAM modulators 22-1 to 22-32 and combines the modulated broadcasting/image signal. The optical transmitter 25 optically modulates the combined broadcasting/image signal, and the IP router 27 routes communication data to either an upper IP network or the EPON OLT function processing unit 28 for processing OLT functions of the EPON. The optical transmitter 29 optically modulates communication data and transmits the modulated communication data to the ONTs 400-1 to 400-16. The optical receiver 210 receives an optical signal from the ONTs 400-1 to 400-16 and converts the received optical signal into electrical signals. The WDM coupler 211 couples the optical-modulated communication signal $\lambda_{DOWN}$ with the optical-modulated broadcasting/image signal $\lambda_B$.

Each ONT of the ONT 400-1 to ONT 400-16 includes a WDM coupler 216, an optical receiver 217, an optical transmitter 218, an EPON ONT function processing unit 220, an optical receiver 219, a divider 221, and QAM demodulators 222, 223. The WDM coupler 216 divides the communication signal $\lambda_{DOWN}$ and the broadcasting/image signal $\lambda_B$ which are transmitted as an optical signal. The optical receiver 217 receives the divided communication signal $\lambda_{DOWN}$ from the WDM coupler 216 and converts the communication signal $\lambda_{DOWN}$ into an electrical signal. The optical transmitter 218 converts a communication signal from a user into an optical signal $\lambda_{up}$ and transmits the converted optical signal $\lambda_{UP}$ to the OLT 300. The EPON ONT function processing unit 220 processes functions of the particular ONT. The optical receiver 219 receives the broadcasting/image signal $\lambda_B$ and converts it into an electrical signal. The divider 221 divides this electrical signal into signals according to each image source. Each of the QAM demodulators 222, 223 detects a signal having a frequency component, which is assigned to each of ONTs 400-1 to 400-16, and restores broadcasting/image data.

In upstream communication (from the ONT to the OLT), each user selects a broadcasting/image channel which the user wants to watch by means of a remote control, etc., and the selected signal, which is broadcasting/image channel selection data 225, is transmitted from the ONTs to the broadcasting/image channel selection control unit 26 via the EPON. Digital broadcasting data and digital image data are inputted to the broadcasting/image channel selecting switch 21. The broadcasting/image channel selecting switch 21 switches and outputs broadcasting/image channels, which each user wants to watch, by control signals of a broadcasting/image channel selection control unit 26.

As a first step in the downstream communication (from the OLT to the ONU), the broadcasting/image channel selection control unit 26 controls the broadcasting/image channel selecting switch 21 to switch broadcasting/image channels 212-1 to 212-16 according to what each user wants to watch. For simplicity of demonstration, FIG. 2 shows that each user or ONU is limited to a maximum of two from among broadcasting/image channels 212-1 to 212-16, although the intended scope the present invention is not limited to a choice between merely two channels. For example, the user on ONU 400-16 is shown to have a choice between a channel on frequency $f_{16,1}$ or $f_{16,2}$, either one of which may carry any one of the digital broadcasting or digital image channels inputted to the selection switch 21. As described above, since the OLT 300 controls and transmits the broadcasting/image channels, there is no necessity of outputting multiple broadcasting/image channels. That is, there is no need for employing an EDFA used for including all broadcasting/image channels in the conventional PON structure.

Figure 3:
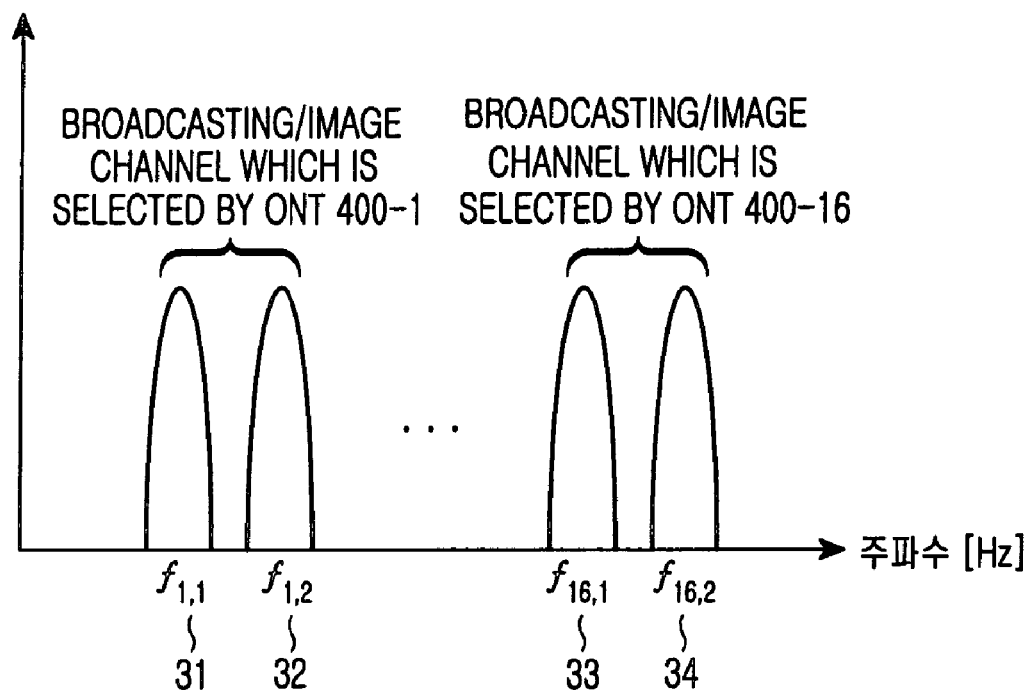
FIG. 3 is an exemplary view showing a frequency domain, which is assigned according to a user, according to the present invention.

As mentioned, two particular frequencies are assigned to each of ONTs 400-1 to 400-16. Such an example of frequency assignment is shown in FIG. 3. As shown in FIG. 3, two frequencies $f_{1,1}$ 31 and $f_{1,2}$ 32 are assigned to the ONT 400-1 and two frequencies $f_{16,1}$ 33 and $f_{16,2}$ 34 are assigned to the ONT 400-16. That is, two frequencies $f_{i,1}$ and $f_{i,2}$ are assigned to i-th ONT 400-i. As described above, since different frequencies are assigned to each ONT, and broadcasting/image signals are transmitted from the OLT to the ONTs by means of different frequencies, collision between broadcasting/image signals for each ONT is prevented.

Broadcasting/image signals, which are selected by the ONT 400-1, from among broadcasting/image data outputted from the broadcasting/image channel selecting switch 21 by means of such frequency assignment, are digitally modulated by the QAM modulators 22-1 to 22-32 each pair of which use the two frequencies $f_{i,1}$ and $f_{i,2}$ as carriers.

Next, the digitally modulated broadcasting/image signals are combined into one signal by the combiner 24, and then the combined signal is optically modulated into an optical signal having a wavelength of $\lambda_B$. The modulated optical signal is coupled with the optically modulated communication signal $\lambda_{DOWN}$ by the WDM coupler 211, and the coupled signal is transmitted to the ONTs 400-1 to 400-16.

Preferably in parallel with the formation of the optically converted broadcasting/image signal $\lambda_B$, communication data transmitted from an upper IP network is processed by the EPON OLT function processing unit 28, which processes EPON functions, after passing through the IP router 27. The processed signal is optically modulated into an optical signal having a wavelength of $\lambda_{DOWN}$ by the optical transmitter 29. Then, the modulated optical signal is coupled with the optically converted broadcasting/image signal $\lambda_B$ by the WDM coupler 211, and the coupled signal is transmitted to the ONTs 400-1 to 400-16.

The wavelength $\lambda_{DOWN}$ of the communication signal and the wavelength $\lambda_B$ of the broadcasting/image signal are coupled by the WDM coupler 211, and the coupled signal is sent to each of ONTs 400-1 to 400-16 via the optical divider 215.

Next, the WDM coupler 216 in an input portion in the ONTs 400-1 to 400-16 re-divides the coupled signal into the communication signal $\lambda_{DOWN}$ and the broadcasting/image signal $\lambda_B$. The divided communication signal $\lambda_{DOWN}$ is converted into an electrical signal by the optical receiver 217, and the converted electrical signal is outputted as communication data (downstream) 224-1, which are transmitted to terminal devices, such as a computer, via the EPON ONT function processing unit 220.

The divided broadcasting/image signal $\lambda_B$ is converted into an electrical signal by the optical receiver 219, and the converted electrical signal is divided into two broadcasting/image signals $f_{i,1}$, $f_{i,2}$ by the divider 221. Only frequency components assigned to the respective ONT in the two divided signals are detected, and the detected frequency components are restored to digital broadcasting/image data 226-1, 226-2 by the QAM demodulators 222, 223. These data 226-1, 226-2 are then transmitted to terminal devices such as a TV set.

Each ONT generates upstream data which include IP communication data 224-2 generated in a computer, etc., and broadcasting/image channel selection data 225 for watching digital broadcasting/image channel. Then, the EPON ONT function processing unit 220 solves such problems as data collision which may happen in the upstream data. Thereafter, the upstream data are optical-modulated into an optical signal having a wavelength of $\lambda_{UP}$ by the optical transmitter 218, and the modulated optical signal is transmitted to the OLT 300 via the WDM coupler 216 and the optical divider 215. Herein, control operation of the OLT 300 is performed through broadcasting/image channel selection data 225 generated by the ONT. That data 225 may include an upstream signal in an interactive broadcasting which is processed in a similar manner.

The upstream signal transmitted to the OLT 300 is received by the optical receiver 210 through the WDM coupler 211 in the OLT 300, and the received signal is converted into an electrical signal.

The converted upstream signal is transmitted to the EPON OLT function processing unit 28. In the EPON OLT function processing unit 28, the broadcasting/image channel selection data 225 in the upstream signal is transmitted to the broadcasting/image channel selection control unit 26, and IP communication data in the upstream signal is transmitted to an upper IP network through the IP router 27.

Figure 4:
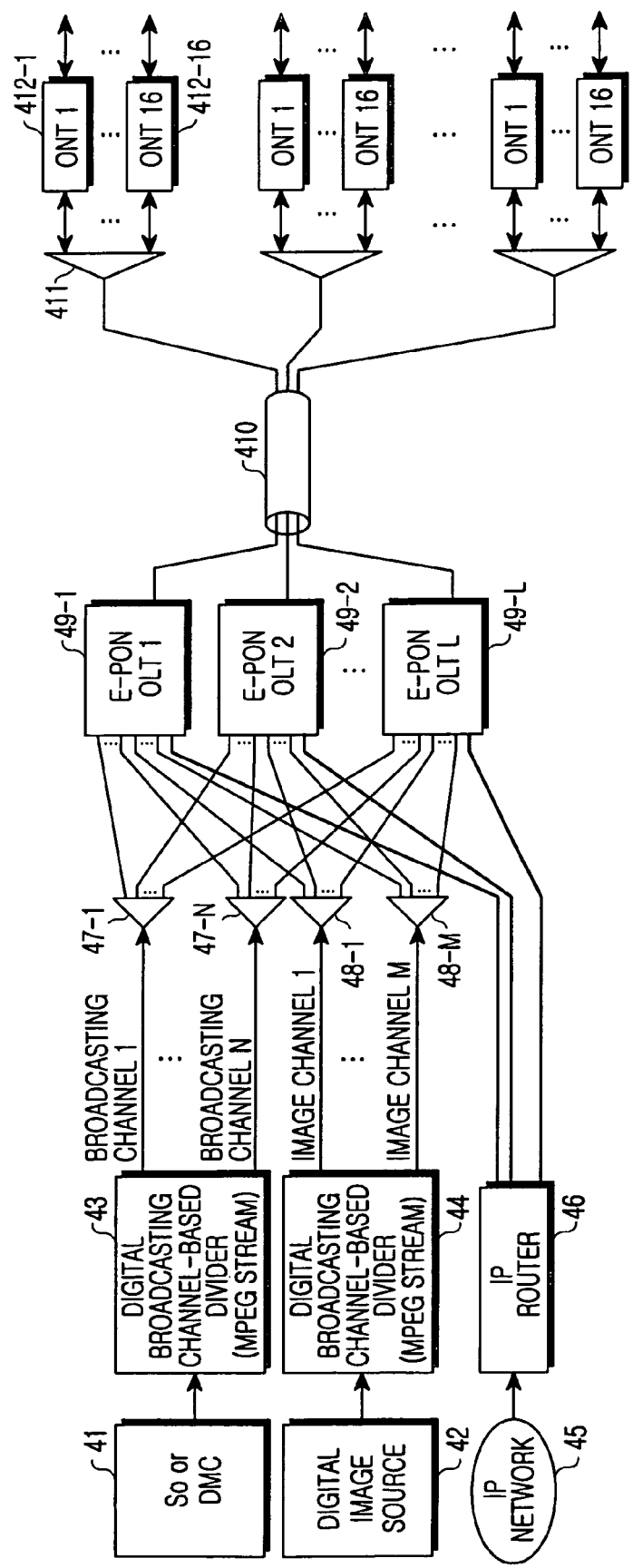
FIG. 4 is a block diagram of a complex EPON for convergence of broadcasting and communication including multiple EPONs according to an embodiment of the present invention.

FIG. 4 is a block diagram depicting, in accordance with an embodiment of the present invention, an example of a complex EPON configured for convergence of broadcasting and communication and including multiple EPONs. The complex EPON shown in FIG. 4 has a structure employing L number of OLTs and L x n number of ONTs. Digital broadcasting signals transmitted from either a service operator (SO) or a digital media center (DMC) 41 are divided into N number of MPEG digital broadcasting channels by a digital broadcasting channel-based divider 43. Each of the divided MPEG digital broadcasting channels is divided into L number of channels by each of dividers 47-1 to 47-N, and then each of the divided channels is transmitted to each of L number of EPON OLTs 49-1 to 49-L. In addition, digital image data transmitted from a digital image source 42 are divided into M number of MPEG digital image channels by a digital image channel-based divider 44. Each of the divided MPEG digital image channels is divided into L number of channels by each of dividers 48-1 to 48-N, and then the divided channels are transmitted to L number of EPON OLTs 49-1 to 49-L. Communication data transmitted from an IP network 45 are routed by an IP router 46, and the routed data are transmitted to L number of EPON OLTs 49-1 to 49-L.

As demonstrated above with regard to the present invention, an OLT selects broadcasting channels required by subscribers and transmits the selected channels to an ONT, so that the EPON need not employ an EDFA for including multiple broadcastings and the ONT can employ an optical receiver for receiving broadcastings with a low price and specifications of low quality.

Further, in the present invention, a quality of service (QoS) can be secured in transmitting not only a digital broadcasting but also a digital image of high quality which will be required by subscribers in the future.

Additionally with regard to the present invention, since broadcasting information is transmitted through a communication data line in an EPON, interactive broadcasting functions can be performed.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An Ethernet passive optical network (EPON) for convergence of broadcasting and communication, the Ethernet passive optical network comprising:

an optical line terminal (OLT) for switching digital broadcasting and/or digital image data according to broadcasting and/or image selection information from each of multiple optical network terminals (ONTs), modulating the switched data into frequencies assigned to each ONT of the multiple ONTs, coupling with a communication signal a signal formed from combining the modulated data, and transmitting the coupled signal, the digital broadcasting and/or digital image data being transmitted from an outside broadcaster, the communication signal being obtained by optically modulating communication data from IP network;

said multiple ONTs, said ONTs being configured for receiving an optical signal from the OLT, dividing the optical signal into the combined signal and the communication signal, convening the divided signals into electrical signals, demodulating the converted combined signal into assigned frequencies, outputting the demodulated information and the converted communication signal to a user, receiving from the user communication data and the broadcasting and/or image selection information, and outputting the communication data and broadcasting and/or image selection information to the OLT; and a divider for dividing the signal from the OLT among the multiple ONTs, joining signals from the multiple ONTs, and transmitting the joined signal to the OLT;

wherein frequency components are assigned to each ONT with specific broadcasting and/or image transmission frequencies according to ONTs, so as to prevent broadcasting and/or image signals selected by each ONT from colliding with each other on an optical line.

2. The EPON for convergence of broadcasting and communication as claimed in claim 1, wherein the OLT comprises:

a broadcasting and/or image channel selection switch for receiving from an external source MPEG broadcasting and MPEG image data, and switching the received MPEG data;

multiple QAM modulators for digitally modulating broadcasting and/or image channels, which are outputted from the broadcasting and/or image, channel selection switch, into carrier frequencies assigned to each ONT to create respective broadcasting and/or image signals;

a combiner for receiving said broadcasting and/or image signals and combining the received broadcasting and/or image signals into one signal which is said signal formed from combining the modulated data;

a first optical transmitter for optically modulating said one signal;

an EPON OLT function processing unit for processing OLT functions of an EPON;

an IP router for routing communication data to either an upper IP network or the EPON OLT function processing unit;

a second optical transmitter for optically modulating communication data from the multiple ONTs;

a first optical receiver for receiving optical signals from the multiple ONTs, converting the received optical signals into electrical signals, and transmitting the converted signals to the EPON OLT function processing unit;

a broadcasting and/or image channel selection control unit for receiving broadcasting and/or image selection information from the EPON OLT function processing unit and transmitting control signals to the broadcasting and/or image channel selection switch, the broadcasting and/or image selection information being transmitted from the multiple ONTs, the control signals being used in order to select broadcasting and/or image channels corresponding to the multiple ONTs; and a first WDM coupler for forming said coupled signal, and outputting said coupled signal as an optical signal.

3. Ethernet passive optical network (EPON) for convergence of broadcasting and communication, the Ethernet passive optical network comprising:

an optical line terminal (OLT) for switching digital broadcasting and/or digital image data according to broadcasting and/or image selection information from each of multiple optical network terminals (ONTs), modulating the switched data into frequencies assigned to each ONT of the multiple ONTs, coupling with a communication signal a signal formed from combining the modulated data, and transmitting the coupled signal, the digital broadcasting and/or digital image data being transmitted from an outside broadcaster, the communication signal being obtained by optically modulating communication data from an IP network;

said multiple ONTs, said ONTs being configured for receiving an optical signal from the OLT, dividing the optical signal into the combined signal and the communication signal, converting the divided signals into electrical signals, demodulating the converted combined signal into assigned frequencies, outputting the demodulated information and the converted communication signal to a user, receiving from the user communication data and the broadcasting and/or image selection information, and outputting the communication data and broadcasting and/or image selection information to the OLT; and a divider for dividing the signal from the OLT among the multiple ONTs, joining signals from the multiple ONTs, and transmitting the joined signal to the OLT, wherein the OLT comprises:

a broadcasting and/or image channel selection switch for receiving from an external source MPEG broadcasting and MPEG image data, and switching the received MPEG data;

multiple QAM modulators far digitally modulating broadcasting and/or image channels, which are outputted from the broadcasting and/or image channel selection switch, into carrier frequencies assigned to each ONT to create respective broadcasting and/or image signals;

a combiner for receiving said broadcasting and/or image signals and combining the received broadcasting and/or image signals into one signal which is said signal formed from combining the modulated data;

a first optical transmitter for optically modulating said one signal;

an EPON OLT function processing unit for processing OLT functions of an EPON;

an IP router for routing communication data to either an upper IP network or the EPON OLT function processing unit;

a second optical transmitter for optically modulating communication data from the multiple ONTs;

a first optical receiver for receiving optical signals from the multiple ONTs, converting the received optical signals into electrical signals, and transmitting the converted signals to the EPON OLT function processing unit;

a broadcasting and/or image channel selection control unit for receiving broadcasting and/or image selection information from the EPON OLT function processing unit and transmitting control signals to the broadcasting and/or image channel selection switch, the broadcasting and/or image selection information being transmitted from the multiple ONTs, the control signals being used in order to select broadcasting and/or image channels corresponding to the multiple ONTs; and a first WDM coupler for forming said coupled signal, and outputting said coupled signal as an optical signal, and wherein each of the multiple ONTs comprising:

a second WDM coupler for dividing the optical signal transmitted from the OLT into a communication signal $\lambda_{DOWN}$ and a broadcasting/image signal $\lambda_B$;

a second optical receiver for receiving the divided communication signal $\lambda_{DOWN}$ and converting the received signal into an electrical signal;

a third optical receiver for receiving the divided broadcasting/image signal $\lambda_B$ and converting the received signal into an electrical signal;

an EPON OLT function processing unit for processing ONT functions;

a third optical transmitter for receiving said communication data and broadcasting and/or image selection information from the EPON ONT function processing unit, and outputting an optical signal $\lambda_{UP}$;

a divider for dividing the converted broadcasting and/or image signal into signals according to each image source; and multiple QAM demodulators for detecting signals, which have frequency components assigned according to ONTs, from the divided broadcasting and/or image signals, and then restoring broadcasting and/or image data.

4. The EPON for convergence of broadcasting and communication as claimed in claim 3, wherein the frequency components are assigned to each ONT with specific broadcasting and/or image transmission frequencies according to ONTs, so as to prevent broadcasting and/or image signals selected by each ONT from colliding with each other on an optical line.

5. The EPON for convergence of broadcasting and communication as claimed in claim 3, wherein an upstream signal in an interactive broadcasting is transmitted by means of broadcasting and/or image selection information from the ONT.

6. An Ethernet passive optical network (EPON) for convergence of broadcasting and communication, the Ethernet passive optical network comprising:

an optical line terminal (OLT) for switching digital broadcasting and/or digital image data according broadcasting and/or image selection information from each of multiple optical network terminals (ONTs), modulating the switched data into frequencies assigned to each ONT of the multiple ONTs, coupling with a communication signal a signal formed from combining the modulated data, and transmitting the coupled signal, the digital broadcasting and/or digital image data being transmitted from an outside broadcaster, the communication signal being obtained by optically modulating communication data from an IP network;

said multiple ONTs, said ONTs being configured for receiving an optical signal from the OLT, dividing the optical signal into the combined signal and the communication signal, converting the divided signals into electrical signals, demodulating the converted combined signal into assigned frequencies, outputting the demodulated information and the converted communication signal to a user, receiving from the user communication data and the broadcasting and/or image selection information, and outputting the communication data and broadcasting and/or image selection information to the OLT; and a divider for dividing the signal from the OLT among the multiple ONTs, joining signals from the multiple ONTs, and transmitting the joined signal to the OLT, wherein each of the multiple ONTs comprising:

a WDM coupler for dividing the optical signal transmitted from the OLT into the communication signal $\lambda_{DOWN}$ and a broadcasting and/or image signals $\lambda_B$;

a second optical receiver for receiving the divided communication signal $\lambda_{DOWN}$ and converting the received signal into an electrical signal;

a third optical receiver for receiving the divided broadcasting and/or image signal $\lambda_B$, and convening the received signal into an electrical signal;

an EPON OLT function processing unit for processing ONT functions;

a third optical transmitter for receiving a communication signal and broadcasting and/or image selection information, which are transmitted from an ONT of the multiple ONTs to the OLT, from the EPON OLT function processing unit, and outputting an optical signal $\lambda_{UP}$;

a divider for dividing the converted broadcasting and/or image signal into signals according to each image source; and multiple QAM demodulators for detecting signals, which have frequency components assigned according to ONTs, from the divided broadcasting and/or image signals, and then restoring broadcasting and/or image data.

7. The EPON for convergence of broadcasting and communication as claimed in claim 6, wherein the frequency components are assigned to each ONT with specific broadcasting and/or image transmission frequencies according to ONTs, so as to prevent broadcasting and/or image signals selected by each ONT from colliding with each other on an optical line.

8. The EPON for convergence of broadcasting and communication as claimed in claim 6, wherein an upstream signal in an interactive broadcasting is transmitted by means of broadcasting and/or image selection information from the ONT.

9. The EPON of claim 1, wherein the OLT is configured for switching both digital broadcasting and digital image data.

10. The EPON of claim 9, wherein said converted combined signal is demodulated into a plurality of frequencies for an ONT of said multiple ONTs.

11. The EPON of claim 10, comprising a plurality of additional OLTs, at least some of the plural OLTs receiving N broadcasting channels and M image channels, N and M being positive integers.

12. The EPON of claim 11, wherein each of the plural OLTs receives N broadcasting channels and M image channels, N and M being positive integers.

13. The EPON of claim 1, wherein said converted combined signal is demodulated into a plurality of frequencies for an ONT of said multiple ONTs.

14. The EPON of claim 1, comprising a plurality of additional OLTs, at least some of the plural OLTs receiving N broadcasting channels and M image channels, N and M being positive integers.

15. The EPON of claim 14, wherein each of the plural OLTs receives N broadcasting channels and M image channels, N and M being positive integers.

16. An optical network terminal (ONT) for receiving an optical signal from an optical line terminal (OLT), dividing the optical signal into a digital broadcasting and/or image signal and a communication signal, converting the divided signals into electrical signals, demodulating the converted broadcasting and/or image signal into assigned frequencies, outputting the demodulated broadcasting and/or image information and the convened communication signal to a user, receiving from the user communication data and broadcasting and/or image selection information, and outputting said communication data and broadcasting and/or image selection information to the OLT;

wherein said ONT further comprises:

a WDM coupler for dividing the optical signal transmitted from the OLT into a communication signal $\lambda_{DOWN}$ and a broadcasting and/or image signal $\lambda_B$;

a second optical receiver for receiving the divided communication signal $\lambda_{DOWN}$ and converting the received signal into an electrical signal;

a third optical receiver for receiving the divided broadcasting and/or image signal $\lambda_B$ and converting the received signal into an electrical signal;

an EPON OLT function processing unit for processing ONT functions;

a third optical transmitter for receiving said communication data and broadcasting and/or image selection information from the EPON ONT function processing unit, and outputting an optical signal $\lambda_{UP}$;

a divider for dividing the converted broadcasting and/or image signal into signals according to each image source; and multiple QAM demodulators for detecting signals, which have respective frequency components, from the divided broadcasting and/or image signals, and then restoring broadcasting and/or image data.

* * * * *